(12) United States Patent
Anderson et al.

(10) Patent No.: US 6,644,699 B2
(45) Date of Patent: Nov. 11, 2003

(54) FLOATING BUMPER BEAM SYSTEM

(75) Inventors: Jeffrey A. Anderson, Clarksville, MI (US); Sherry LaPeer, Allen Park, MI (US); Chris Pelto, Waterford, MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 34 days.

(21) Appl. No.: 09/917,561

(22) Filed: Jul. 27, 2001

(65) Prior Publication Data

US 2002/0017794 A1 Feb. 14, 2002

Related U.S. Application Data

(60) Provisional application No. 60/221,416, filed on Jul. 28, 2000.

(51) Int. Cl.$^7$ .................................................. B60R 19/04
(52) U.S. Cl. ........................ 293/102; 293/155; 293/151
(58) Field of Search ................................. 293/102, 120, 293/121, 122, 154, 155, 149, 126, 132, 133, 139, 151, 152, 153

(56) References Cited

U.S. PATENT DOCUMENTS 4,440,429 A    4/1984  Eyb
6,042,163 A *  3/2000  Reiffer ........................ 293/155
6,318,775 B1 * 11/2001 Heatherington et al. .... 293/120

FOREIGN PATENT DOCUMENTS

DE     29622715 U1    4/1997
EP     0 870 649 A2  10/1998

OTHER PUBLICATIONS

"Bumper Reinforcing Material Made of Aluminum Alloy for Automobile," *Patent Abstracts of Japan*, publication number 07186849, publication date Jul. 25, 1995.

* cited by examiner

*Primary Examiner*—Joseph D. Pape
(74) *Attorney, Agent, or Firm*—McDonnell Boehnen Hulbert & Berghoff

(57) ABSTRACT

A bumper beam assembly comprising a center beam and at least two end caps that mount the center beam between structural components extending outward from a vehicle and a method of selectively altering side or offset impact resistance of a bumper beam assembly separate from the bumper beam assembly's front impact resistance by providing crush zones in the end caps and adjusting parameters for said end caps to alter the side or offset impact resistance.

11 Claims, 4 Drawing Sheets

FLOATING BUMPER BEAM SYSTEM

BACKGROUND OF THE INVENTION

1. Field of the Invention

The invention relates to a vehicular bumper beam system and, more specifically, to a bumper beam system that maximizes both front and angled barrier low speed impact performance while allowing vehicle rails to be brought forward and closer to an exterior fascia therefor.

2. Related Art

Current and future trends in styling for vehicles are tending toward increase curvature on the front (and sometimes) rear ends of vehicles. As this curvature increases, a bumper system for either the front or rear of the vehicle should be configured to effectively shield the transverse face of the vehicle from impact. In known prior art bumper systems, the bumper beam typically comprises a laterally-extending unitary beam member mounted near each end to outer (e.g., forward) ends of vehicle structural rails in a "B-section" bumper beam or flush-mounted in a stamped version of a bumper beam.

For example, a B-section beam mounts in front of the vehicular structural rails, i.e., to the forward ends thereof and, in order to improve packaging space is end formed. The B-section-type beam works well in frontal barrier impacts because of its high stiffness. But this high stiffness of the B-section-type beam can be detrimental in angled barrier impacts as it increases the load on the structural rails and absorbs less energy from these side direction impacts. In addition, this type of beam takes up more room and reduces the amount of foam that can be used as an energy-absorbing beam.

Conversely, the stamping-type of beam typically performs worse on frontal barrier impacts as it typically has less stiffness than a B-section-type beam. Further, this type of beam does not perform well in angled barrier impacts because this type of beam is flush-mounted to the rail. However, the stamped-type bumper beam does allow more packaging space within the bumper system to allow for a maximum amount of foam to be added to absorb the energy of an impact.

An example configuration of a front mounted B-section-type beam is shown in U.S. Pat. No. 6,042,163. This reference describes a bumper in which an end piece is welded on the end of a curved beam. The rear wall of the end piece is, in turn, welded to the forward end of structural rails or other components ("stays 23") which extend outward from the vehicle and are used to mount the bumper to the vehicle. The end pieces thus serve to position a curved bumper beam in front of flat-ended structural components extending from the vehicle and to mount the curved bumper beam to those structural components.

This configuration suffers from a number of deficiencies. To the extent that structural components extending outward from the vehicle (which are typically designed as additional crushable energy-absorbing components) are lengthened to increase their energy-absorbing capability, the design of such end caps requires the bumper to protrude further from the vehicle, thus increasing the overall vehicle length and the overall bulk of the bumper components. This, in turn, limits vehicle designers by limiting any attempts to streamline or otherwise minimize the appearance of the bumper.

The design of these prior art end pieces also rely on the structure of the B-section beam for their energy management during an offset or corner impact, and do not provide for any additional energy-absorbing structure.

Finally, the design of these prior art end pieces do not allow an engineer to separately optimize bumper configurations for both forward and offset and corner impacts. With this prior art configuration, designing the B-section-type beam and structural components extending outward from the vehicle to improve forward impact resistance may result in poorer offset or side impact resistance, without allowing the engineer to separately tune or alter the components to adjust for the different types of impacts.

To achieve 5-star compliance for high speed impact, the length of the vehicle structural rails have been increased without an increase in overall vehicle length. This has reduced the space available for an effective energy management/bumper system to fit into the available space between a vehicle fascia and the engine components without affecting styling (such as that required when the vehicle fascia has a high degree of curvature). Moreover, in such high-speed impacts, the structural rails are designed to carry much of the energy. A component that allows the engineer to direct the energy away from the bumper beam and more directly to the structural rails, or to provide a separate "crush space" with different parameters or characteristics than those of the bumper beam in front of the structural rails, would therefore be advantageous.

SUMMARY OF THE INVENTION

The invention relates to a vehicular bumper beam system and, more specifically, to a bumper beam system that maximizes both front and angled barrier low speed impact performance while allowing vehicle rails to be brought forward and closer to an exterior fascia therefor and, thus, requires a lower vehicle length. The invention overcomes the limitations of the prior art by contemplating a "floating" center beam which is interconnected to vehicular rails by adapter elements, referred to as end caps which provide many benefits over prior art bumper systems.

Other objects, features, and advantages of the invention will be apparent from the ensuing description in conjunction with the accompanying drawings.

DETAILED DESCRIPTION

Figure 1:
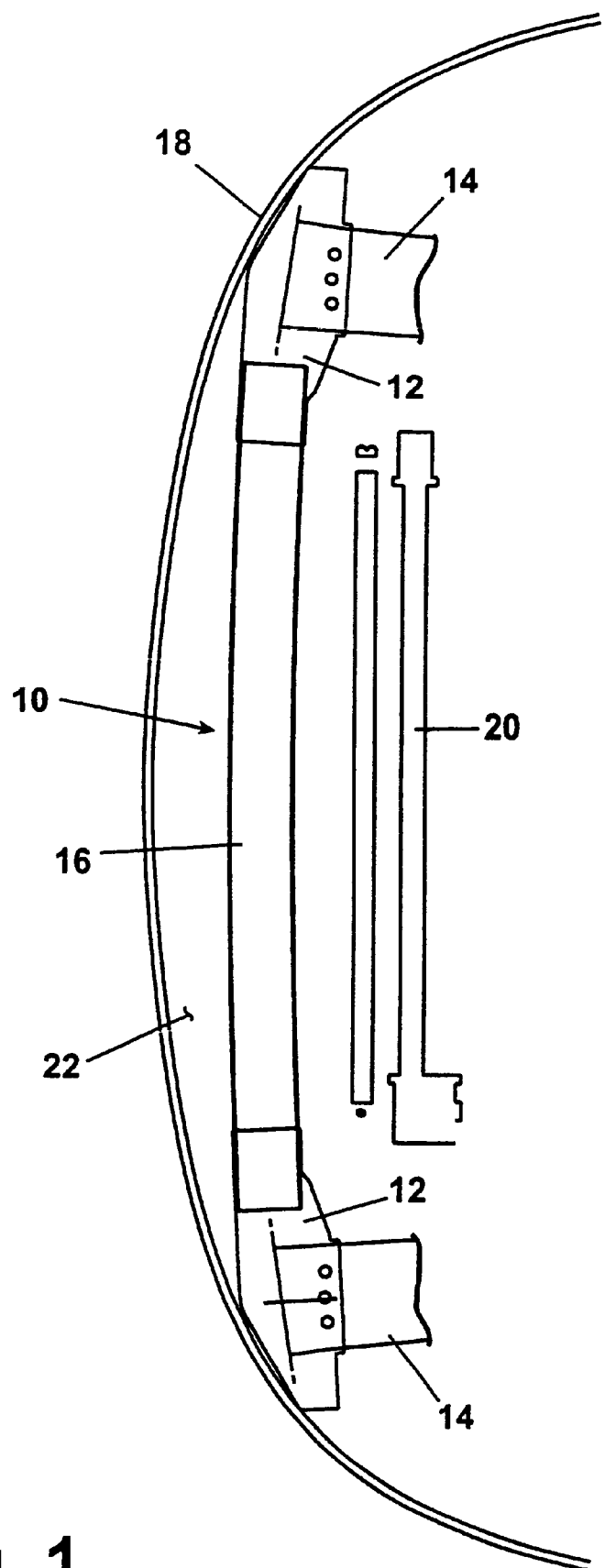
FIG. 1 is a top schematic view of a floating bumper beam assembly comprising a pair of end caps mounted to vehicular rails which are interconnected by a floating center beam according to the invention shown disposed within a vehicle fascia having a high degree of curvature.
Figure 2:
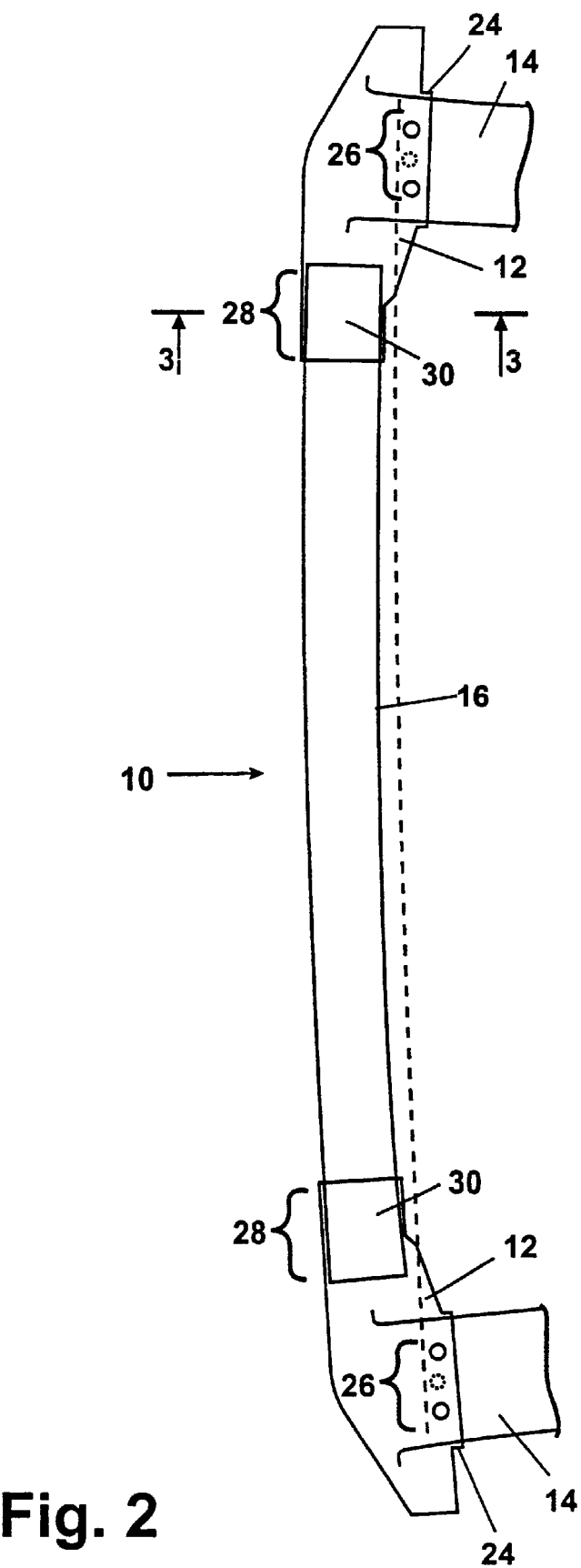
FIG. 2 is a top schematic view of a floating bumper beam assembly of FIG. 1 comprising a pair of end caps mounted to vehicular rails which are interconnected by a floating center beam.

The invention relates to a vehicular bumper beam system and, more specifically, to a bumper beam system that maximizes both front and angled barrier low speed impact performance while allowing vehicle rails to be brought forward and closer to an exterior fascia therefor. Specifically, FIG. 1 shows a floating bumper beam assembly 10 comprising a pair of end caps 12 mounted to structural components extending outward from the vehicle, such as vehicular rails 14, which end caps are interconnected by a floating center beam 16 according to the invention. In this specification, since such bumper assemblies can be used at either end of the vehicle, "in front of" refers not to the front of the vehicle, but to the orientation of the outer end or external-most section of the bumper assembly or vehicle fascia.

The bumper beam assembly is shown located within a vehicle fascia 18 and in front of other vehicle components 20 thus disposed within a "packaging" space 22 within the vehicle.

The end caps 12 include a first mounting flange 24 provided with suitable mounting apertures 26. The first mounting flange 24 receives an end of a rail 14 and is mounted thereto by any known fashion, such as by conventional fasteners which pass through apertures in the rails 14 aligned with the mounting apertures 26 in the beam.

The end caps 12 also include a second mounting flange 28 provided with a suitable mounting portion for receiving ends 30 of the center beam 16. The ends 30 of the center beam 16 are received onto and/or into the suitable mounting portion of the second mounting flange 28 and fastened thereto by any suitable means including fasteners, welding, riveting, bolting, etc. The second mounting flange 28 preferably opens in a direction that is transverse to the first mounting flange 24, and generally perpendicular thereto. Each end cap 12 preferably has a second mounting flange 28 on one rail 14 that faces the second mounting flange 28 on the opposing end cap 12 located on the other rail 14.

Figure 3:
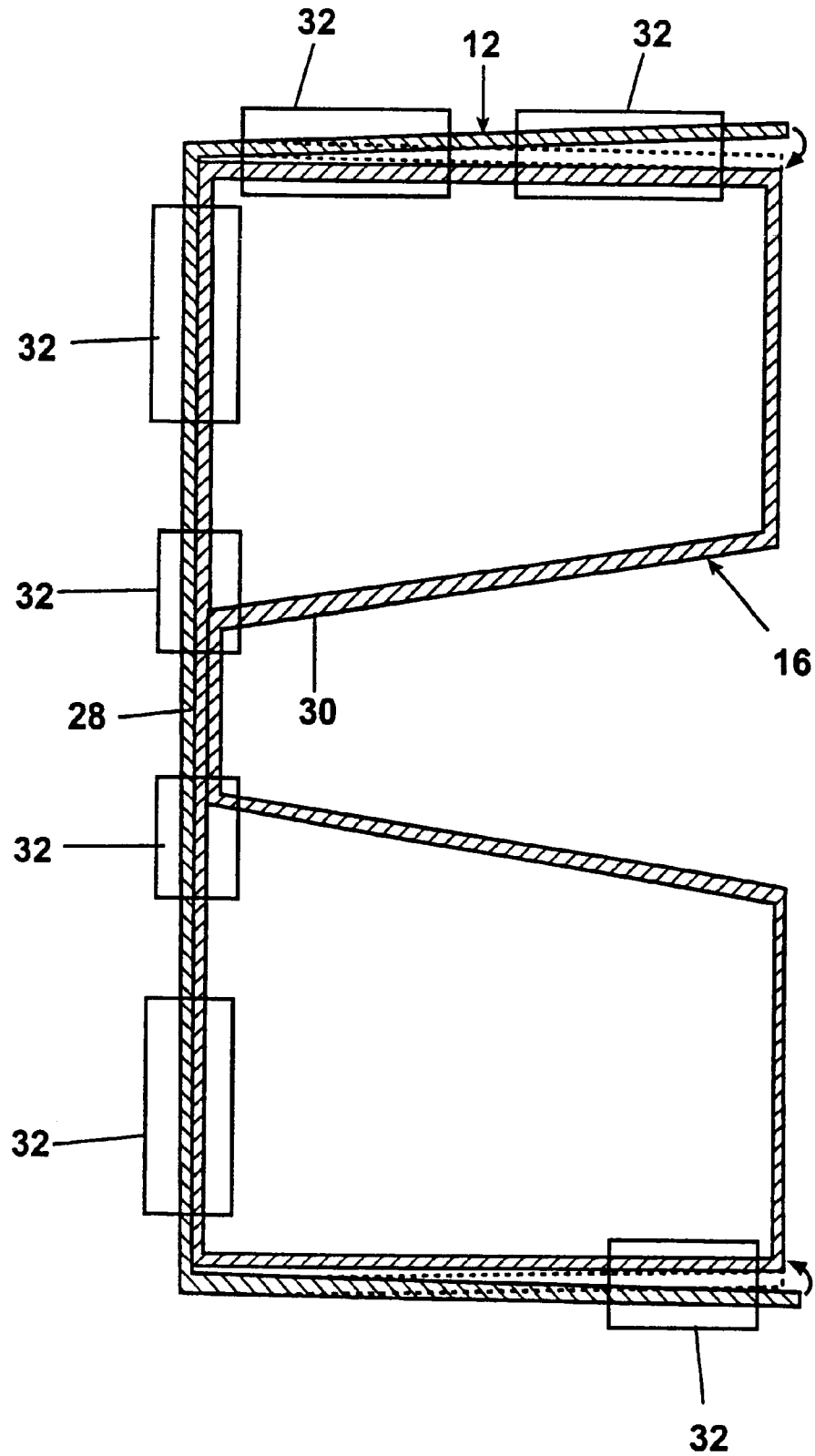
FIG. 3 is a cross-sectional view taken along lines 3—3 of FIG. 2.

As best shown in FIG. 3, the end 30 of the center beam 16 is received within the second mounting flange 28 of the end cap 12 and fastened thereto by several stitch welds 32 at suitable locations. It should be noted that walls of the second mounting flange 28 can be squeezed tight against the end 30 of the center beam 16 for tightening the interconnection between the center beam 16 and the end cap 12 by the welds 32.

Preferably, each rail 14 receives an end cap 12 via the first mounting flange 24 as described above and the ends 30 of the center beam are each mounted to the second mounting flange 28. Thus, the bumper beam system 10, according to the invention, locates the center beam 16 intermediate the typical known locations of a forwardly-located position in a B-section type bumper and the flush-mount position of a stamped-type bumper. This intermediate positioning is accomplished by the forward spacing from the ends of the rails 14 provided by the first mounting flange 24 of the end caps 12 and the inwardly lateral spacing provided by the second mounting flange 28. The forward and lateral spacing between the first and second mounting flanges 24 and 28 provide this intermediate spacing.

This intermediate positioning of the center beam 16 has been found to utilize the best positioning of both known prior art configurations (B-section—and stamped-type prior art beams) to absorb energy in both frontal barrier impacts, as well as in 30-degree barrier impacts.

The inventive bumper beam system 10 provides the stiffness of the B-section-type beam for frontal barrier impacts, as well as provides a better energy management system for the angled barrier impacts. Because the bumper beam system 10 is not flush-mounted to the rails 14, there is available space between the center beam 16 interior surface and the ends of the rails 14 for a "crush zone" thus absorbing energy. The bumper beam assembly 10 also allows the provision of a foam energy absorber as is known in the art, more so than a B-section-type beam allows, but less than a stamped-type beam. Further, since the end caps 12 can crush and thereby absorb energy, the need for large amounts of a foam energy absorber, and indeed, for a foam absorber at all, is reduced.

The bumper beam system 10 further permits great flexibility in "tuning" the system to a particular vehicle's energy-absorbing needs independently such as in the areas of foam thickness and crush space. Various parameters for the end caps 12 can thereby be selected for each system 10 to allow it to begin crushing at a desired time to protect the rails 14 and other damageable systems, such as the components 22.

These configurable and preselectable parameters include the type and thickness of the material making up the falls of the end caps 12, the provision of strengthening ribs thereon, and areas of weakness (such as thin plate areas and apertures in the end caps 12) can be added in predetermined areas on the end caps 12 to have the method of crush styled to maximize energy absorption for impacts from the frontal and angled barriers.

According to the invention, the center beam 16 of the bumper beam system 10 does not load the rails 14 directly, but rather is interconnected to the rails 14 via the crushable end caps 12. This differs from known prior art bumper systems which typically mount a unitary member directly to the rails. The center beam 16 herein "floats" between the rails, and can be stiffened to the point where it is nearly rigid. In this case, the end caps 12 can be tuned as described above to collapse and absorb energy during both frontal and angled barrier impacts. As used herein, mounting of the center beam "between" structural components extending outward from the vehicles, such as vehicle rails 14, means that the center beam is disposed anywhere between the vertical planes set by those structural components, including any desired distance fore and aft of the ends of those structural components. As shown in FIG. 1, for example, the center beam 16 can extend some distance forward of the vehicle rails 14 while being considered "between" those rails.

Thus, with the new vehicular designs being advanced today, the inventive bumper beam system 10 described herein is not limited by changes in vehicle styling (e.g., vehicle frontal curvature) to package an energy absorbing beam.

In one vehicular example, the distance between the ends of the rails 14 and the outer fascia 18 is about 30 mm. An average prior art B-section beam requires 70 mm of clearance, and even when if the B-section beam is end formed to fit its ends within the 30 mm clearance space, there remains a need to be above 30 mm at the ends of the beam (calling into mind that a B-section-type beam has a stiffness to have no energy management in that 30 mm, it is actually stiffer than the rails at that point). Because foam is typically needed within this package space, more than even the 30 mm end clearance is needed.

The stamped-type beam version as known in the prior art can provide clearance at the corners of the beam for foam, but usually requires higher packaging space behind the rail for other components 22 like the cooling system. Those parts need to be protected and in the case of the cooling system need to have a substantial air gap for full function.

The inventive bumper beam assembly 10 described herein can achieve frontal and angled impact absorbency goals without requiring a foam introduction layer. Overall, this design will allow the automobile manufacturers to continue using more aggressive styling without sacrificing safety. Because safety is the utmost concern, compromises are made with respect to prior art bumper systems to ensure compliance with safety regulations. With the inventive system 10 disclosed herein, the need for this compromise is greatly reduced.

Automobile manufacturers continuously tend to increase the curvature of the front ends of vehicles, thereby reducing the available bumper packaging space. An advantage of the present invention is that the configuration of the end caps 12 extends the effective length of the rails 14 which thereby increases the ability of the rails 14 to absorb energy in a high speed impact. The longer the rail 14, the more effectively it performs and the less impact it imparts to passengers in the vehicle. Thus, by designing the end caps 12 with a crush space having appropriate parameters in front of the structural rail 14 or other such component, an engineer can improve high impact performance of the bumper assembly over conventional bumpers as well, and vary the high impact performance of the bumper assembly independent of the low impact performance.

Figure 4:
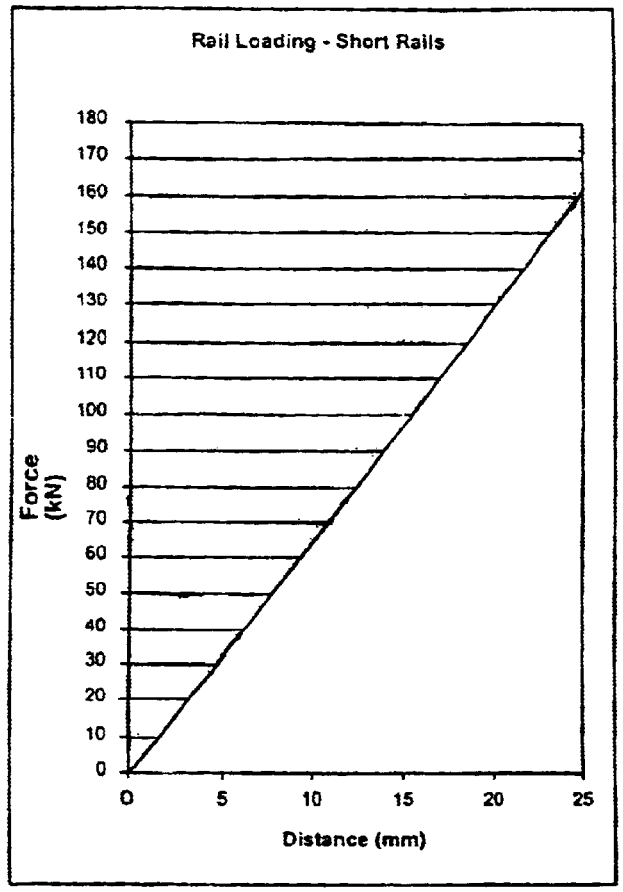
FIG. 4 is a graph showing a force-distance analysis for a typical impact on a vehicle having a short vehicular structural rail configuration.
Figure 5:
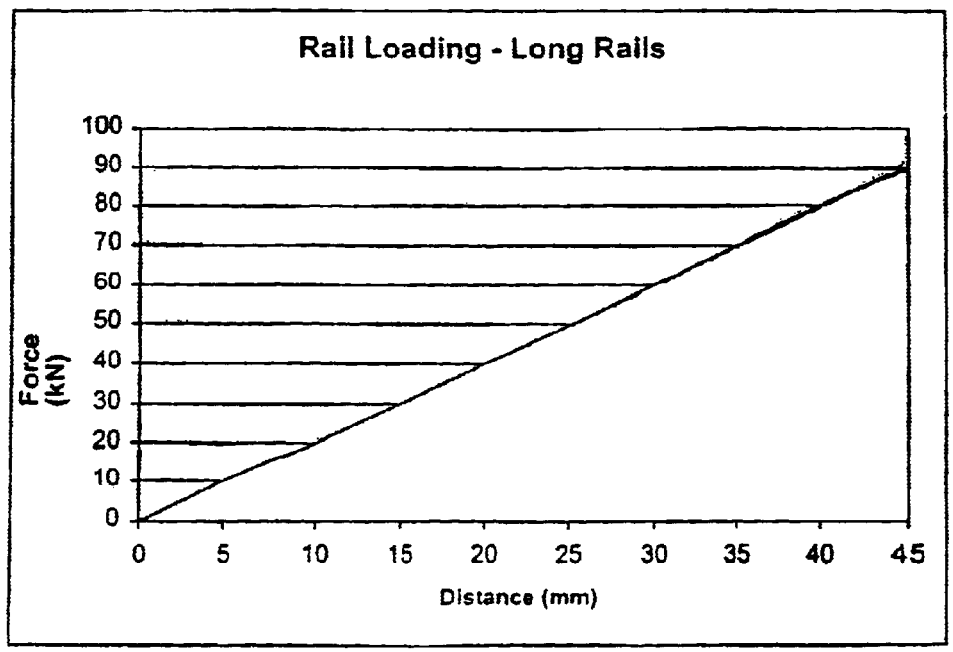
FIG. 5 is a graph showing a force-distance analysis for a typical impact on a vehicle having a long vehicular structural rail configuration.

As best described with reference to the fictional data portrayed in FIGS. 4 and 5 in engineering terms, the bumper system 10 described herein allows the crush of the rails 14 to occur over a longer distance. As energy is equal to force times distance traveled, with a fixed amount of energy, the more distance you can travel, the less force is generated (see FIG. 4 for shorter rails as compared to the force absorbed with longer rails in FIG. 5).

The inventive bumper system 10 also reduces the effective weight of the bumper because the length of the center beam is reduced while the thickness of the material making up the center beam can be optimally selected for stiffness to frontal barrier impacts.

It is well known that the primary method to increase the stiffness of a bumper beam beyond currently-produced high strength steels is to increase the material thickness. In prior art beams, that meant that to improve the beam the material thickness of the whole beam had to be increased. Now, in the inventive bumper beam system 10 described herein, only the center beam 16 needs to be changed—the end caps 12 can be left as is and serve as an adapter element for mounting the center beam 16 to the rails 14. The end caps 12 can have a different material thickness and can, perhaps, be themselves optimized to handle angled impacts thereon.

This invention has several additional advantages over the prior art. First, the rails 14 can be brought forward with respect to the vehicle (not shown) to maximize the length of the rails 14 for more effective handling of high speed impacts without constricting packaging space for the beam, any foam-substructure or a fascia therefor. Second, the floating center beam 16 has a high stiffness factor for frontal barrier impact. Third, the end caps 12 can be individually tuned for maximum energy absorption from an angled barrier impact. Fourth, this invention provides for a reduction in overall weight of a vehicular bumper beam system 10 by allowing the length of the center beam 16 to be reduced while material thickness is optimized for stiffness to frontal barrier. Fifth, the foam energy absorber, typically found in vehicular bumper beam assemblies, can be either reduced in size or eliminated altogether in the area of angled barrier impact.

An critically important feature of this invention is that the components of the floating bumper beam assembly (i.e., the center beam 16 and end caps 12) can be individually tuned to maximum effectiveness for meeting specific areas of Motor Vehicle Safety Standards (MVSS) and Insurance Institute of Highway Safety (IIHS) for low speed impact compliance, while at the same time, the rails 14 can be brought forward to improve MVSS high speed impact requirements.

The end caps can, of course, be modified in any manner by the designer including by placing them at some position other than then ends of either the center beam or the structural rails or other component extending outward from the vehicle without departing from this invention.

While the invention has been specifically described in connection with certain specific embodiments thereof, it is to be understood that this is by way of illustration and not of limitation, and the scope of the appended claims should be construed as broadly as the prior art will permit.

The inventions claimed are:

1. A bumper beam assembly comprising a center beam and at least two end caps that mount the center beam between structural components extending outward from a vehicle wherein the end caps have a first aperture adapted to receive ends of the structural components extending outward from a vehicle and second aperture adapted to receive opposing ends of the center beam.

2. The bumper beam assembly of claim 1 wherein the end caps include crush zones.

3. The bumper beam assembly of claim 2 wherein the crush zones are located outside of the structural components extending outward from a vehicle.

4. The bumper assembly of claim 2 wherein the crush zones are located in front of the structural components extending outward from a vehicle.

5. The bumper beam assembly of claim 1 wherein the center beam is a B-section-type beam.

6. A bumper beam assembly for mounting on structural components extending outward from a vehicle, such bumper beam assembly comprising a center beam and at least two end caps that mount the center beam such that the entire center beam is disposed between vertical planes formed by each of the structural components wherein an outward surface of each of the end caps is curved or angled to accommodate a curved fascia mounted thereto.

7. A method of selectively altering corner or offset impact resistance of a bumper beam assembly mounted on outwardly-projecting structural components of a vehicle, said assembly comprising a beam and at least two end caps wherein the beam is a center beam mounted between the structural components extending outward from a vehicle, such method comprising forming end caps having a first aperture adapted to receive ends of the structural components extending outward from a vehicle and second aperture adapted to receive opposing ends of the center beam, providing crush zones in the end caps, and adjusting parameters for said end caps to alter the side or offset impact resistance.

8. The method of claim 7 wherein the beam is a center beam mounted between the structural components extending outward from a vehicle.

9. A method of selectively altering corner or offset impact resistance of a bumper beam assembly mounted on outwardly-projecting structural components of a vehicle, said assembly comprising a beam and at least two end caps wherein the beam is a center beam mounted between the structural components extending outward from a vehicle, such method comprising forming end caps that mount the entire beam between vertical planes formed by each of the structural components, providing crush zones in the end caps located outside of the structural components extending outward from a vehicle, and adjusting parameters for said end caps to alter the side or offset impact resistance.

10. The bumper beam assembly of claim 1 wherein the structural components are vehicular rails.

11. A bumper beam assembly for mounting on structural components extending outward from a vehicle, such bumper beam assembly comprising a center beam and at least two end caps that mount the center beam such that the entire center beam is disposed between vertical planes formed by each of the structural components, wherein the end caps include crush zones located outside of the structural components extending outward from a vehicle.

* * * * *